(12) United States Patent
Wu (10) Patent No.: US 9,630,300 B2
(45) Date of Patent: Apr. 25, 2017

(54) REVERSIBLE RATCHET WRENCH (71) Applicant: Kun-Che Wu, Taichung (TW)

(72) Inventor: Kun-Che Wu, Taichung (TW)

(73) Assignee: Kun-Che Wu, Taichung (TW)

( * ) Notice: Subject to any disclaimer, the term of this patent is extended or adjusted under 35 U.S.C. 154(b) by 322 days.

(21) Appl. No.: 14/604,155

(22) Filed: Jan. 23, 2015

(65) Prior Publication Data

US 2015/0258667 A1 Sep. 17, 2015

(30) Foreign Application Priority Data

Mar. 13, 2014 (TW) .............................. 103204303 U (51) Int. Cl.
*B25B 13/46* (2006.01)
*B25B 13/48* (2006.01)
*F16D 41/16* (2006.01)

(52) U.S. Cl.
CPC ............ *B25B 13/465* (2013.01); *F16D 41/16* (2013.01)

(58) Field of Classification Search
CPC ...... B25B 13/465; B25B 13/481; F16D 41/16
See application file for complete search history.

(56) References Cited

U.S. PATENT DOCUMENTS

| 9,120,211 | B2 * | 9/2015 | Huang | .................. | B25B 13/463 |
| | | | | | 81/60 |
| 2015/0027276 | A1 * | 1/2015 | He | .......................... | B25B 17/00 |
| | | | | | 81/57.29 |
| 2016/0075003 | A1 * | 3/2016 | Hu | ........................ | B25B 21/004 |
| | | | | | 81/57.13 |

\* cited by examiner

*Primary Examiner* — David B Thomas
(74) *Attorney, Agent, or Firm* — Brinks Gilson & Lione; John C. Bacoch (57) ABSTRACT

A reversible ratchet wrench includes a direction-selecting rotary knob disposed rotatably on a driving head and rotatable relative to the driving head between a clockwise position and a counterclockwise position such that, at the clockwise position, a pawl unit is connected between the driving head and a ratchet head so as to allow for clockwise co-rotation of the driving head and the ratchet head, while preventing counterclockwise co-rotation of the driving head and the ratchet head, and at the counterclockwise position, the pawl unit is connected between the driving head and the ratchet head so as to allow for counterclockwise co-rotation of the driving head and the ratchet head, while preventing clockwise co-rotation of the driving head and the ratchet head.

7 Claims, 9 Drawing Sheets

REVERSIBLE RATCHET WRENCH

CROSS-REFERENCE TO RELATED APPLICATION

This application claims priority of Taiwanese Patent Application No. 103204303, filed on Mar. 13, 2014, the entire disclosure of which is hereby incorporated by reference.

FIELD OF THE INVENTION

This invention relates to a wrench, and more particularly to a reversible ratchet wrench.

BACKGROUND OF THE INVENTION

Figure 1:
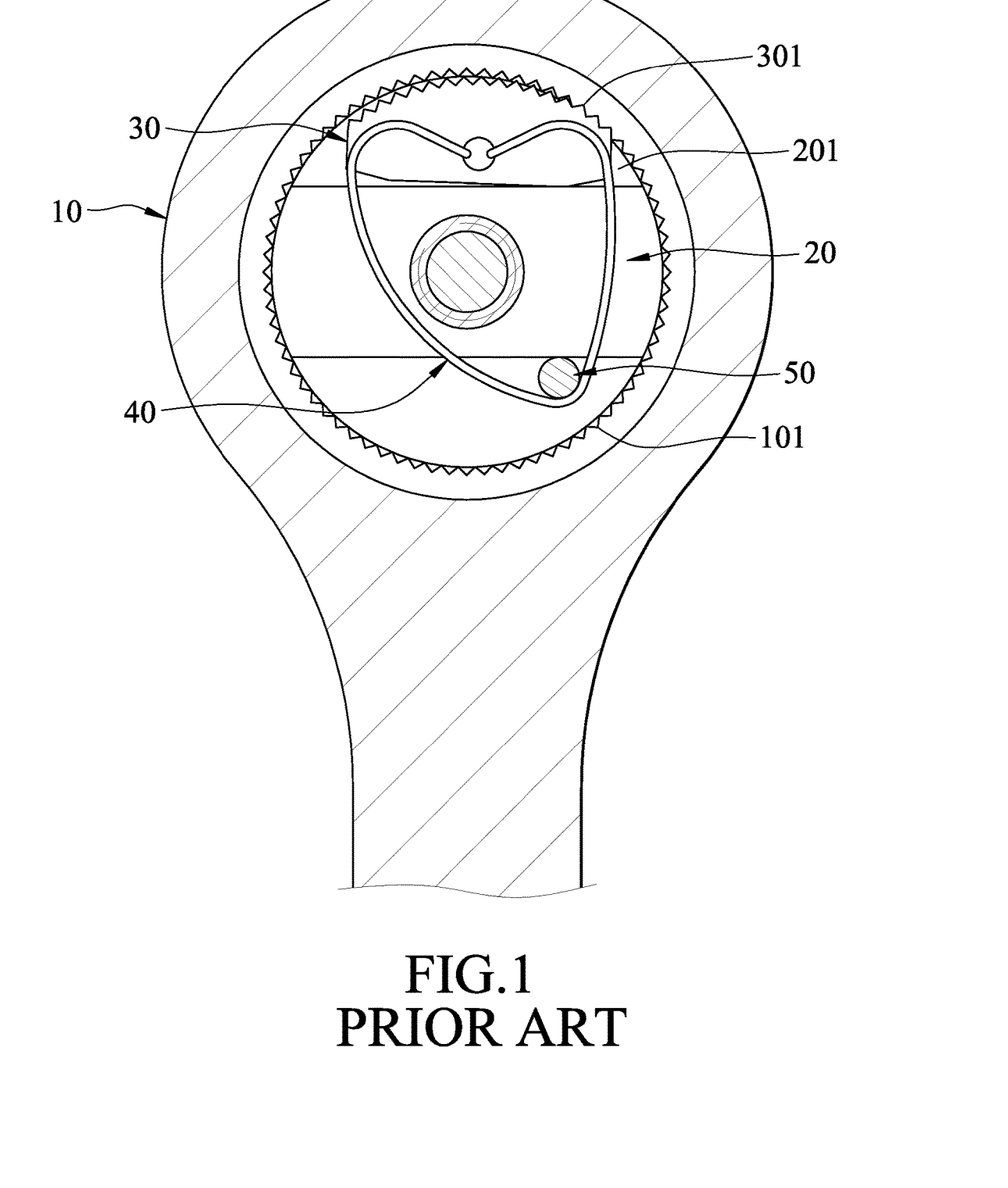
FIG. 1 is a sectional view of a conventional reversible ratchet wrench.

Referring to FIG. 1, a conventional reversible ratchet wrench includes a ratchet head 10, a driving head 20, a pawl 30, a resilient member 40, and a direction-selecting rotary knob 50. The ratchet head 10 includes an annular driving toothed portion 101. The driving head 20 extends through the ratchet head 10, and includes an accommodating space 201 formed in an outer peripheral surface thereof and aligned with the annular driving toothed portion 101. The pawl 30 is disposed in the accommodating space 201, and has a ratchet toothed portion 301 engageable with the annular driving toothed portion 101. The resilient member 40 biases the pawl 30 to engage the annular driving toothed portion 101. The direction-selecting rotary knob 50 is rotatable between first and second positions. When the direction-selecting rotary knob 50 is at the first position, the driving head 20 is limited to rotate in a direction. When the direction-selecting rotary knob 50 is at the second position, the driving head 20 is limited to rotate in an opposite direction. However, since the minimum idle rotation distance of the wrench corresponds to one ratchet tooth, the wrench is not suitable for use in a narrower working space.

SUMMARY OF THE INVENTION

The object of this invention is to provide a reversible ratchet wrench that is suitable for use in a narrower working space.

According to this invention, a reversible ratchet wrench includes a direction-selecting rotary knob disposed rotatably on a driving head and rotatable relative to the driving head between a clockwise position and a counterclockwise position such that, at the clockwise position, a pawl unit is connected between the driving head and a ratchet head so as to allow for clockwise co-rotation of the driving head and the ratchet head, while preventing counterclockwise co-rotation of the driving head and the ratchet head, and at the counterclockwise position, the pawl unit is connected between the driving head and the ratchet head so as to allow for counterclockwise co-rotation of the driving head and the ratchet head, while preventing clockwise co-rotation of the driving head and the ratchet head.

BRIEF DESCRIPTION OF THE DRAWINGS

These and other features and advantages of this invention will become apparent in the following detailed description of the embodiments of this invention, with reference to the accompanying drawings, in which.

DETAILED DESCRIPTION OF THE EMBODIMENTS

Before the present invention is described in greater detail in connection with the embodiments, it should be noted that similar elements and structures are designated by like reference numerals throughout the entire disclosure.

Figure 2:
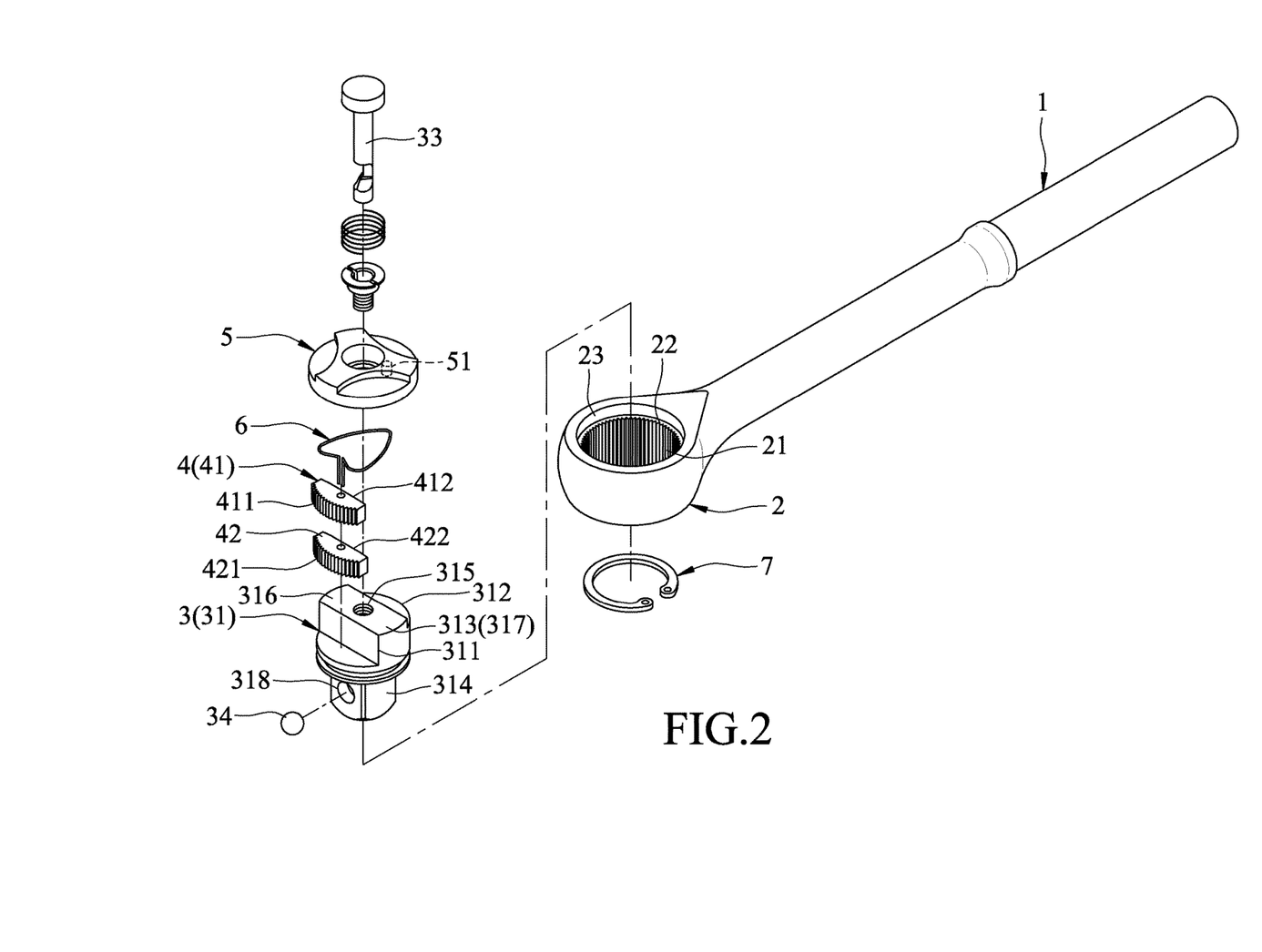
FIG. 2 is an exploded perspective view of the first embodiment of a reversible ratchet wrench according to this invention.
Figure 3:
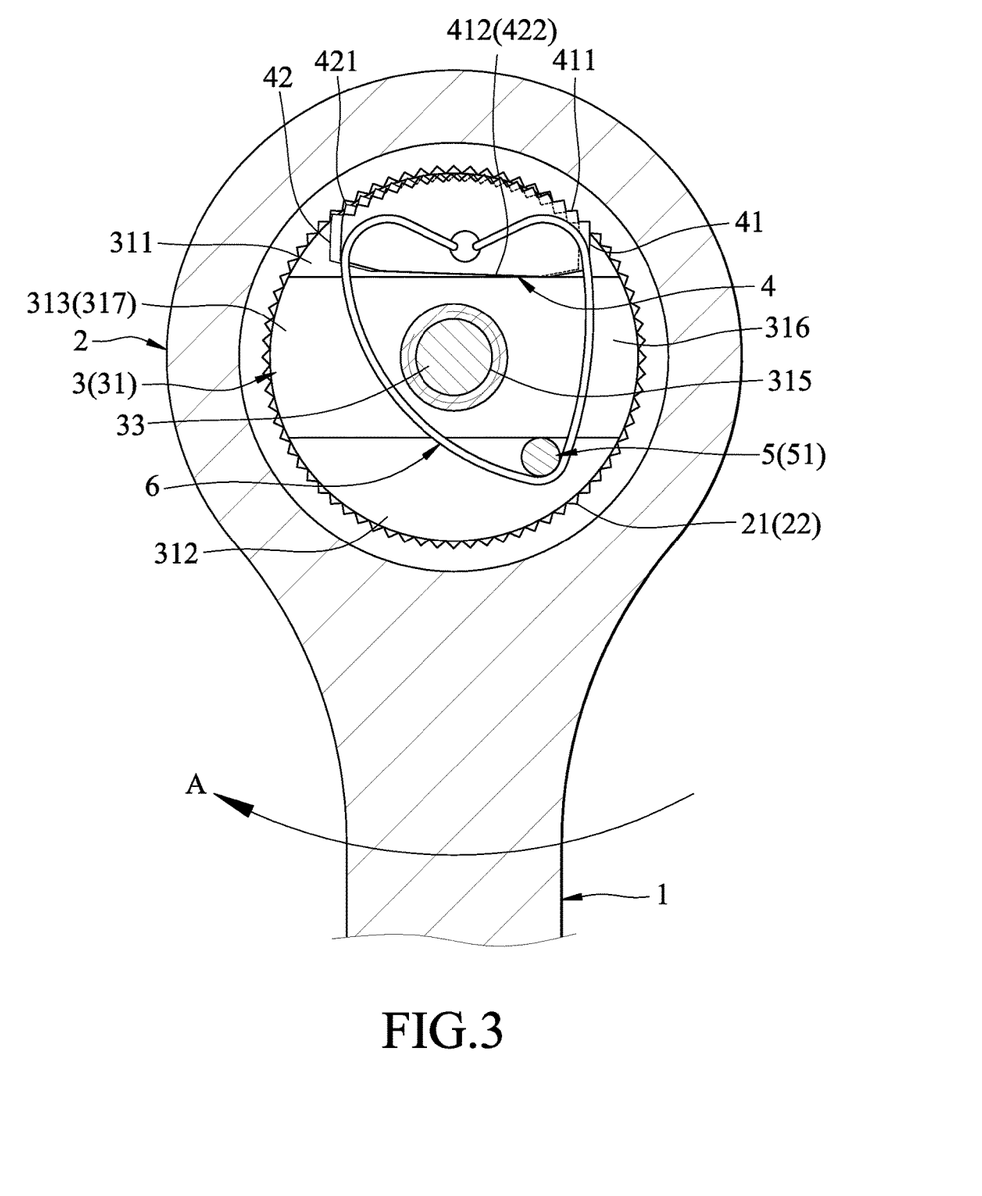
FIG. 3 is a fragmentary sectional view of the first embodiment, illustrating that a direction-selecting rotary knob is at a clockwise position and a handle is rotated clockwise.

Referring to FIGS. 2 and 3, the first embodiment of a reversible ratchet wrench according to this invention includes a handle 1, a ratchet head 2, a driving unit 3, a pawl unit 4, a direction-selecting rotary knob 5, a resilient member 6, and a C-shaped retaining ring 7.

The ratchet head 2 is connected to an end of the handle 1, and includes an annular driving toothed portion 21, and a through hole 22 defining by the annular driving toothed portion 21.

The driving unit 3 includes a driving head 31, a spring-biased pressing rod 33, and a ball 34. The driving head 31 extends rotatably through the through hole 22, and includes: an accommodating space 311 formed in an outer peripheral surface thereof, opened upwardly, and aligned with the annular driving toothed portion 21; a slide space 312 formed in the outer peripheral surface, opened upwardly, and opposite to the accommodating space 311; a contact wall 313 disposed between the accommodating space 311 and the slide space 312; a driving end 314 disposed at a lower end of the driving head 31; and an axial hole 315 extending through the contact wall 313 and the driving end 314. The contact wall 313 has a clockwise end portion 316 and a counterclockwise end portion 317 that are opposite to each other. The driving end 314 has a radial hole 318 formed in an outer peripheral surface thereof and in spatial communication with the axial hole 315. The pressing rod 33 extends axially through the axial hole 315. The ball 34 is disposed in the radial hole 318 in a known manner so as to allow the driving end 314 to drive a fastener (not shown).

The pawl unit 4 includes a first pawl 41 and a second pawl 42 that overlap each other. Each of the first and second pawls 41, 42 has a ratchet toothed portion 411, 421 engageable with the annular driving toothed portion 21, and a contact portion 412, 422 opposite to the ratchet toothed portion 411, 421 and in slidable contact with the contact wall 313. When one of the first and second pawls 41, 42 meshes with the annular driving toothed portion 21, the other of the first and second pawls 41, 42 cannot mesh with the annular driving toothed portion 21.

The direction-selecting rotary knob 5 is disposed rotatably on the driving head 31, is rotatable about a rotating axis extending through the contact wall 313, and includes a sliding post 51 formed on a bottom surface thereof and disposed in the slide space 312. In this embodiment, the direction-selecting rotary knob 5 is rotatable relative to the driving head 31 between a clockwise direction and a counterclockwise position.

The resilient member 6 is disposed between the direction-selecting rotary knob 5 and the driving head 31, and is connected to the sliding post 51 and the pawl unit 4 for biasing the pawl unit 4 and the sliding post 51 to contact one of the clockwise end portion 316 and the counterclockwise end portion 317.

The C-shaped retaining ring 7 is received in an annular groove in an outer surface of the driving head 31, and abuts against a bottom surface of the ratchet head 2, and the direction-selecting rotary knob 5 abuts against a shoulder 23 (see FIG. 2) of the ratchet head 2, so as to prevent vertical movement of the driving head 31 relative to the ratchet head 2.

With particular reference to FIG. 3, when it is desired to rotate the fastener in a clockwise direction (A), the direction-selecting rotary knob 5 is rotated to the clockwise position, where the sliding post 51 contacts the clockwise end portion 316 of the contact wall 313 and where the pawl unit 4 is biased to contact the clockwise end portion 316 of the contact wall 313 and engage the annular driving toothed portion 21, such that the ratchet toothed portion 411 of the first pawl 41 meshes with the annular driving toothed portion 21, and the ratchet toothed portion 421 of the second pawl 42 does not mesh with the annular driving toothed portion 21.

Subsequently, when the handle 1 and the annular driving toothed portion 21 are rotated in the clockwise direction (A), due to engagement between the first pawl 41 with the annular driving toothed portion 21 and contact between the first pawl 41 and the clockwise end portion 316 of the contact wall 313, the driving head 31 is rotated in the clockwise direction (A) to drive rotation of the fastener in the clockwise direction (A).

Figure 4:
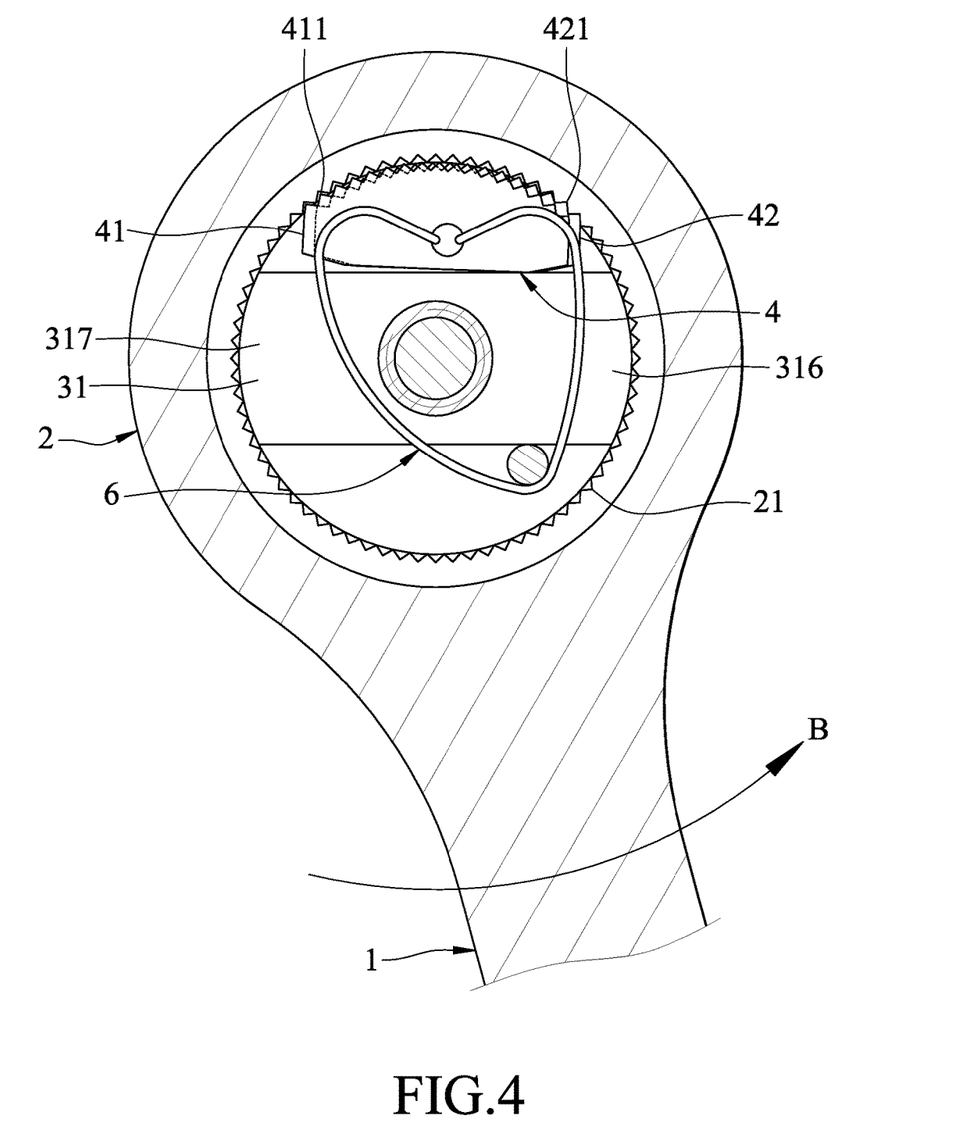
FIG. 4 is a view similar to FIG. 3 but illustrating that the direction-selecting rotary knob is at the clockwise position and the handle is rotated counterclockwise.

When the handle 1 and the annular driving toothed portion 21 are rotated in a counterclockwise direction (B), since the resilient member 6 biases the pawl unit 4 toward the clockwise end portion 316, the ratchet toothed portion 411 of the first pawl 41 is removed from the annular driving toothed portion 21. During counterclockwise rotation of the driving toothed portion 21, when the driving toothed portion 21 is rotated by a distance corresponding to one half tooth of the ratchet toothed portion 411 of the first pawl 41, it meshes with the ratchet toothed portion 421 of the second pawl 42. Afterwards, when the driving toothed portion 21 is rotated by a distance corresponding to one half tooth of the ratchet toothed portion 421 of the second pawl 42, it meshes again with the ratchet toothed portion 411 of the first pawl 41. In this manner, the handle 1 can be rotated counterclockwise to a desired position during an idle rotation of the handle 1.

Figure 5:
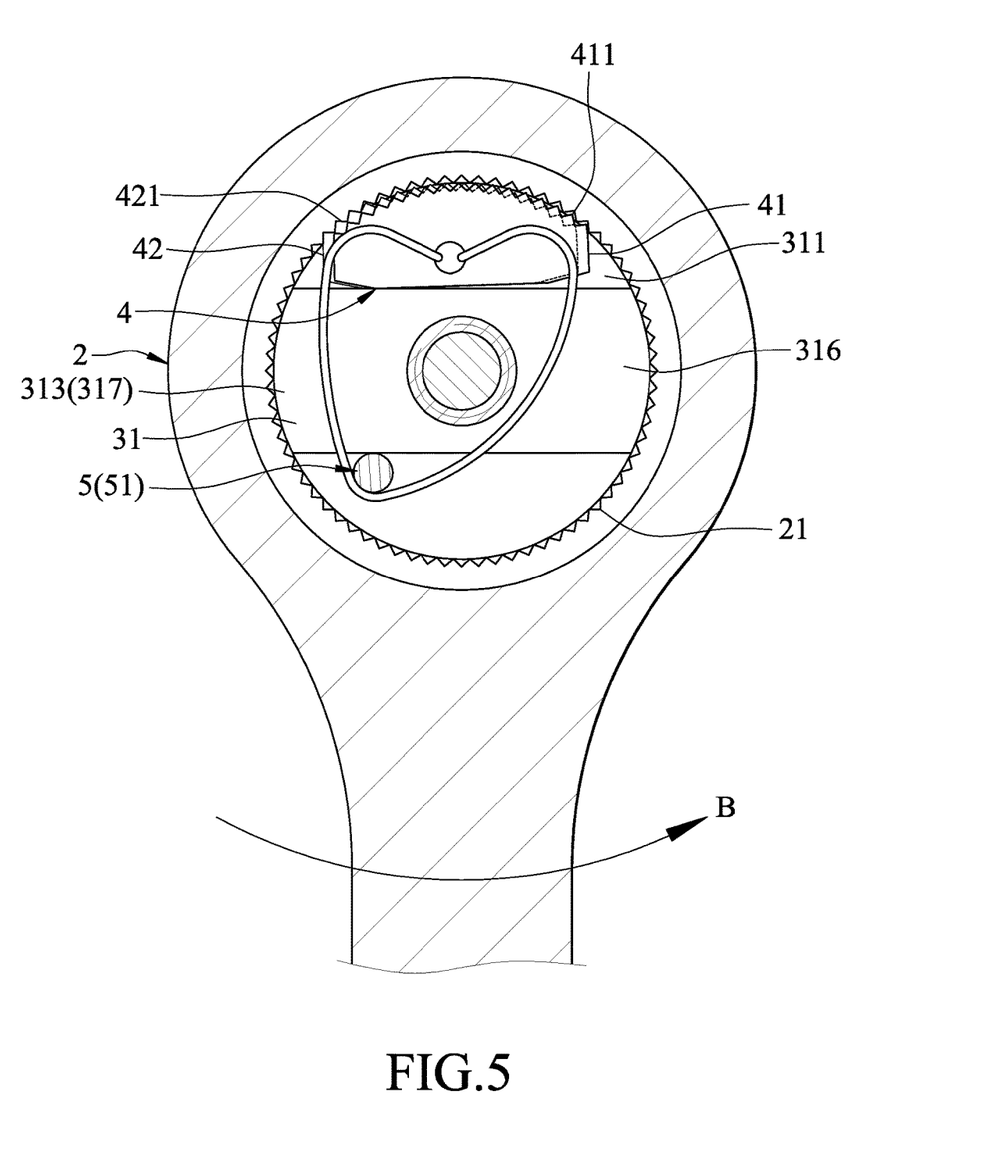
FIG. 5 is a view similar to FIG. 3 but illustrating that the direction-selecting rotary knob is at the counterclockwise position and the handle is rotated counterclockwise.

With particular reference to FIG. 5, when it is desired to rotate the fastener in the counterclockwise direction (B), the direction-selecting rotary knob 5 is rotated to the counterclockwise position, where the sliding post 51 contacts the counterclockwise end portion 317 of the contact wall 313 and where the pawl unit 4 is biased to contact the counterclockwise end portion 317 of the contact wall 313 and engage the annular driving toothed portion 21, such that the ratchet toothed portion 411 of the first pawl 41 does not mesh with the annular driving toothed portion 21, and the ratchet toothed portion 421 of the second pawl 42 meshes with the annular driving toothed portion 21.

Conversely, when the handle 1 and the annular driving toothed portion 21 are rotated in the counterclockwise direction (B), due to engagement between the second pawl 42 with the annular driving toothed portion 21 and contact between the second pawl 42 and the counterclockwise end portion 317 of the contact wall 313, the driving head 31 is rotated in the counterclockwise direction (B) to drive rotation of the fastener in the counterclockwise direction (B).

When the handle 1 and the annular driving toothed portion 21 are rotated in the clockwise direction (A), since the resilient member 6 biases the pawl unit 4 toward the counterclockwise end portion 317, the ratchet toothed portion 421 of the second pawl 42 is removed from the annular driving toothed portion 21. During clockwise rotation of the driving toothed portion 21, when the driving toothed portion 21 is rotated by a distance corresponding to one half tooth of the ratchet toothed portion 421 of the second pawl 42, it meshes with the ratchet toothed portion 411 of the first pawl 41. Afterwards, when the driving toothed portion 21 is rotated by a distance corresponding to one half tooth of the ratchet toothed portion 411 of the first pawl 41, it meshes again with the ratchet toothed portion 421 of the second pawl 42. In this manner, the handle 1 can be rotated clockwise to a desired position during an idle rotation of the handle 1.

Alternatively, the first and second pawls 41, 42 may be formed as one piece.

It should be noted that, due to such an arrangement between the first and second pawls 41, 42, the reversible ratchet wrench of this invention is suitable for use in a narrow working space.

Figure 6:
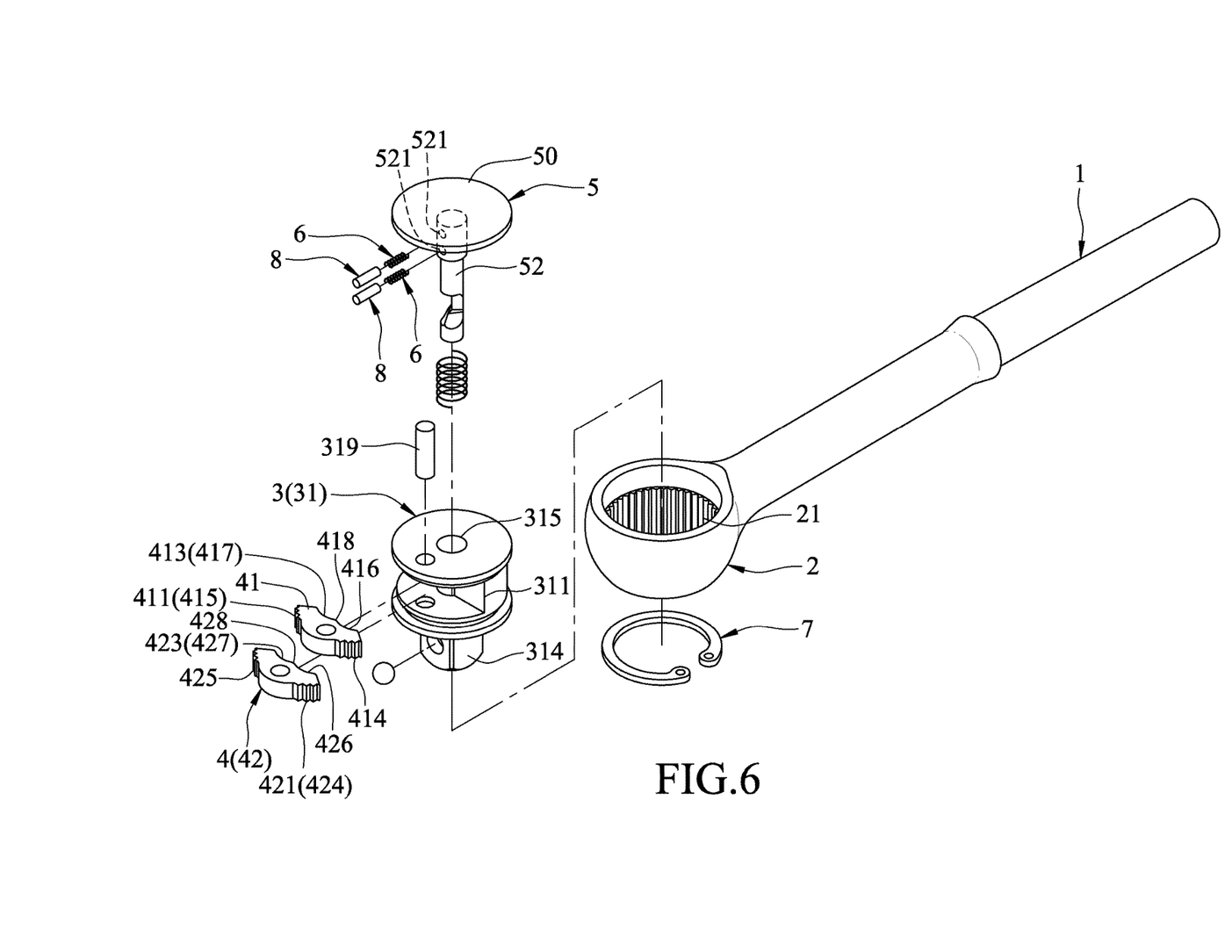
FIG. 6 is an exploded perspective view of the second embodiment of a reversible ratchet wrench according to this invention.
Figure 7:
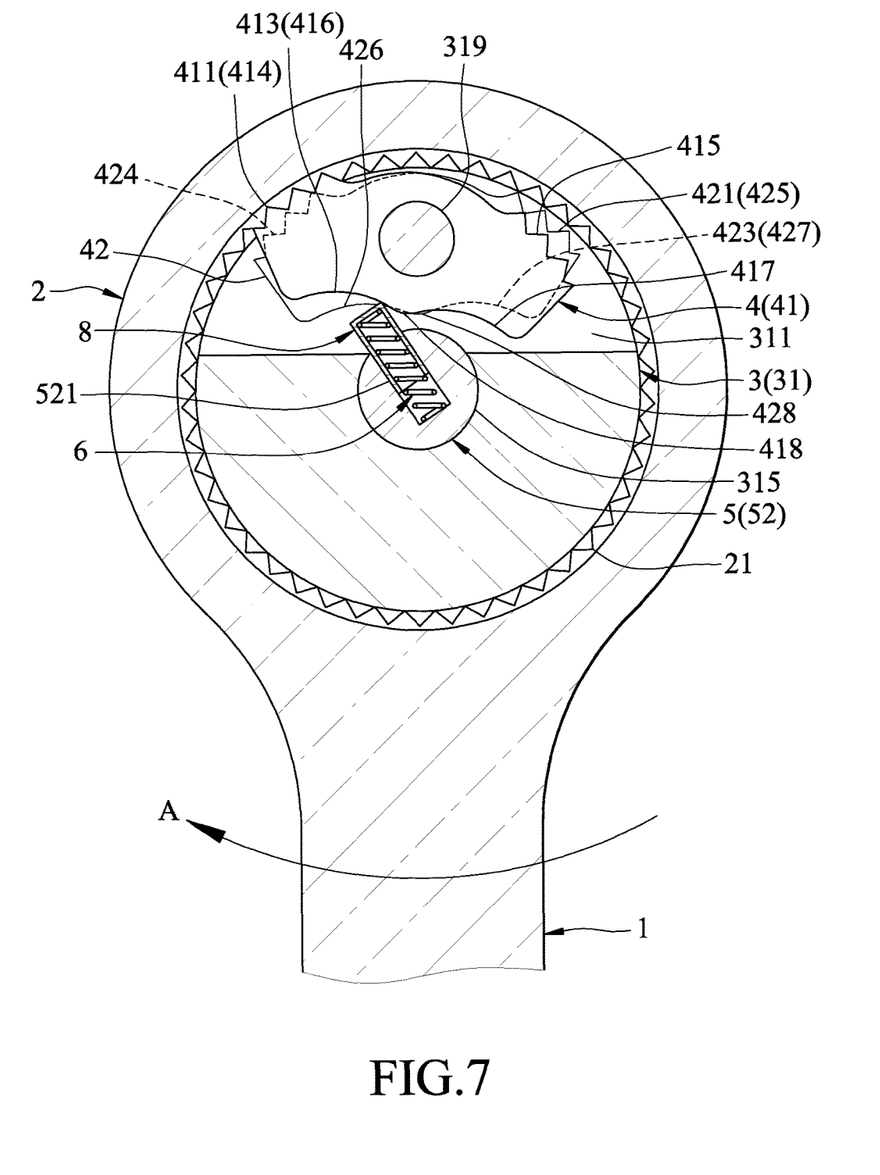
FIG. 7 is a fragmentary sectional view of the second embodiment, illustrating that a direction-selecting rotary knob is at a clockwise position and a handle is rotated clockwise.

FIGS. 6 and 7 show the second embodiment of a reversible ratchet wrench according to this invention, which is similar to the first embodiment and which includes a handle 1, a ratchet head 2, a driving unit 3, a pawl unit 4, a direction-selecting rotary knob 5, two push rods 8, two resilient members 6, and a C-shaped retaining ring 7.

In this embodiment, the driving head 31 of the driving unit 3 includes an accommodating space 311 formed in an outer peripheral surface thereof and aligned with the annular driving toothed portion 21, a vertical axial hole 315 formed through the driving unit 3 and in spatial communication with the accommodating space 311, and a pivot shaft 319 extending through the accommodating space 311.

The first and second pawls 41, 42 of the pawl unit 4 overlap each other, are disposed in the accommodating space 311, and are rotatable about the pivot shaft 319. Each of the first and second pawls 41, 42 has a ratchet toothed portion 411, 421 engageable with the annular driving toothed portion 21, and a concaved portion 413, 423 adjacent to the axial hole 315. Each ratchet toothed portion 411, 421 has a clockwise tooth region 414, 424 and a counterclockwise tooth region 415, 425 that are opposite to each other. In this embodiment, the tooth peaks of the clockwise tooth region 414 and the counterclockwise tooth region 415 of the first pawl 41 are aligned respectively with the tooth valleys of the clockwise tooth region 424 and the counterclockwise tooth region 425 of the second pawl 42, and the tooth valleys of the clockwise tooth region 414 and the counterclockwise tooth region 415 of the first pawl 41 is aligned respectively with the tooth peaks of the clockwise tooth region 424 and the counterclockwise tooth region 425 of the second pawl 42. Each concaved portion 413, 423 has a clockwise concaved region 416, 426 adjacent to the clockwise tooth region 414, 424, a counterclockwise concaved region 417, 427 adjacent to the counterclockwise tooth region 415, 425, and a middle ridge region 418, 428 disposed between the clockwise concaved region 416, 426 and the counterclockwise concaved region 417, 427. Similar to the first embodiment, the tooth peaks of the clockwise tooth region 414 and the counterclockwise tooth region 415 of the first pawl 41 are aligned respectively with the tooth valleys of the clockwise tooth region 424 and the counterclockwise tooth region 425 of the second pawl 42, and the tooth valleys of the clockwise tooth region 414 and the counterclockwise tooth region 415 of the first pawl 41 are aligned respectively with the tooth peaks of the clockwise tooth region 424 and the counterclockwise tooth region 425 of the second pawl 42.

The direction-selecting rotary knob 5 includes a horizontal plate portion 50 and a post portion 52 extending downwardly from the horizontal plate portion 50 and serving as the pressing rod 33 (see FIG. 2). The post portion 52 has two radial holes 521 aligned respectively with the first and second pawls 41, 42.

The resilient members 6 are disposed respectively in the radial holes 521.

The push rods 8 are sleeved respectively on the resilient members 6, and extend respectively into the radial holes 521, such that the push rods 8 are biased by the resilient members 6 to press respectively against the first and second pawls 41, 42, so that one of the first and second pawls 41, 42 meshes with the annular driving toothed portion 21.

With particular reference to FIG. 7, when it is desired to rotate the driving head 31 in the clockwise direction (A), the direction-selecting rotary knob 5 is rotated to the clockwise position, where the push rods 8 contact respectively the concaved portions 413, 423 of the first and second pawls 41, 42, where the clockwise tooth regions 414, 424 of the first and second pawls 41, 42 are biased to mesh with the annular driving toothed portion 21, and where the resilient members 6 bias the pawl unit 4 to rotate in the clockwise direction (A). At this time, the clockwise tooth region 414 of the first pawl 41 meshes with the annular driving toothed portion 21, and the clockwise tooth region 424 of the second pawl 42 does not mesh with the annular driving toothed portion 21. Hence, further clockwise rotation of the first pawl 41 relative to the annular driving toothed portion 21 is prevented.

Subsequently, when the handle 1 and the annular driving toothed portion 21 are rotated in the clockwise direction (A), since the first pawl 41 cannot rotate relative to the annular driving toothed portion 21 in the clockwise direction (A), the driving head 31 co-rotates with the annular driving toothed portion 21 in the clockwise direction (A).

Figure 8:
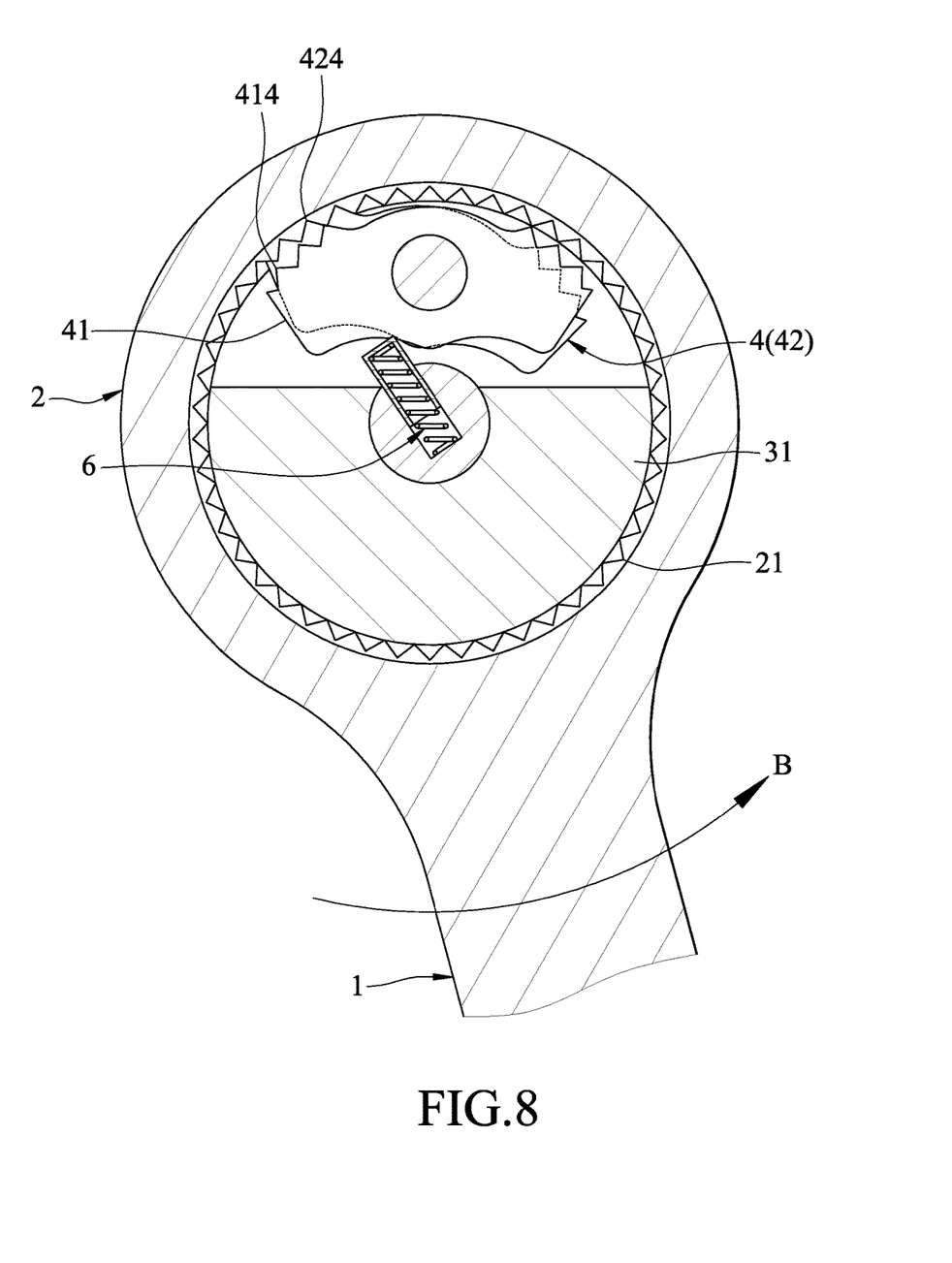
FIG. 8 is a view similar to FIG. 7 but illustrating that the direction-selecting rotary knob is at the clockwise position and the handle is rotated counterclockwise.

With further reference to FIG. 8, when the handle 1 and the annular driving toothed portion 21 are rotated in the counterclockwise direction (B), the pawl unit 4 is biased by the resilient members 6 to remove the clockwise tooth region 414 of the first pawl 41 from the annular driving toothed portion 21. During counterclockwise rotation of the driving toothed portion 21, when the driving toothed portion 21 is rotated by a distance corresponding to one half tooth of the ratchet toothed portion 411 of the first pawl 41, it meshes with the ratchet toothed portion 421 of the second pawl 42. Afterwards, when the driving toothed portion 21 is rotated by a distance corresponding to one half tooth of the ratchet toothed portion 421 of the second pawl 42, it meshes again with the ratchet toothed portion 411 of the first pawl 41 In this manner, the handle 1 can be rotated counterclockwise to a desired position during an idle rotation of the handle 1.

Figure 9:
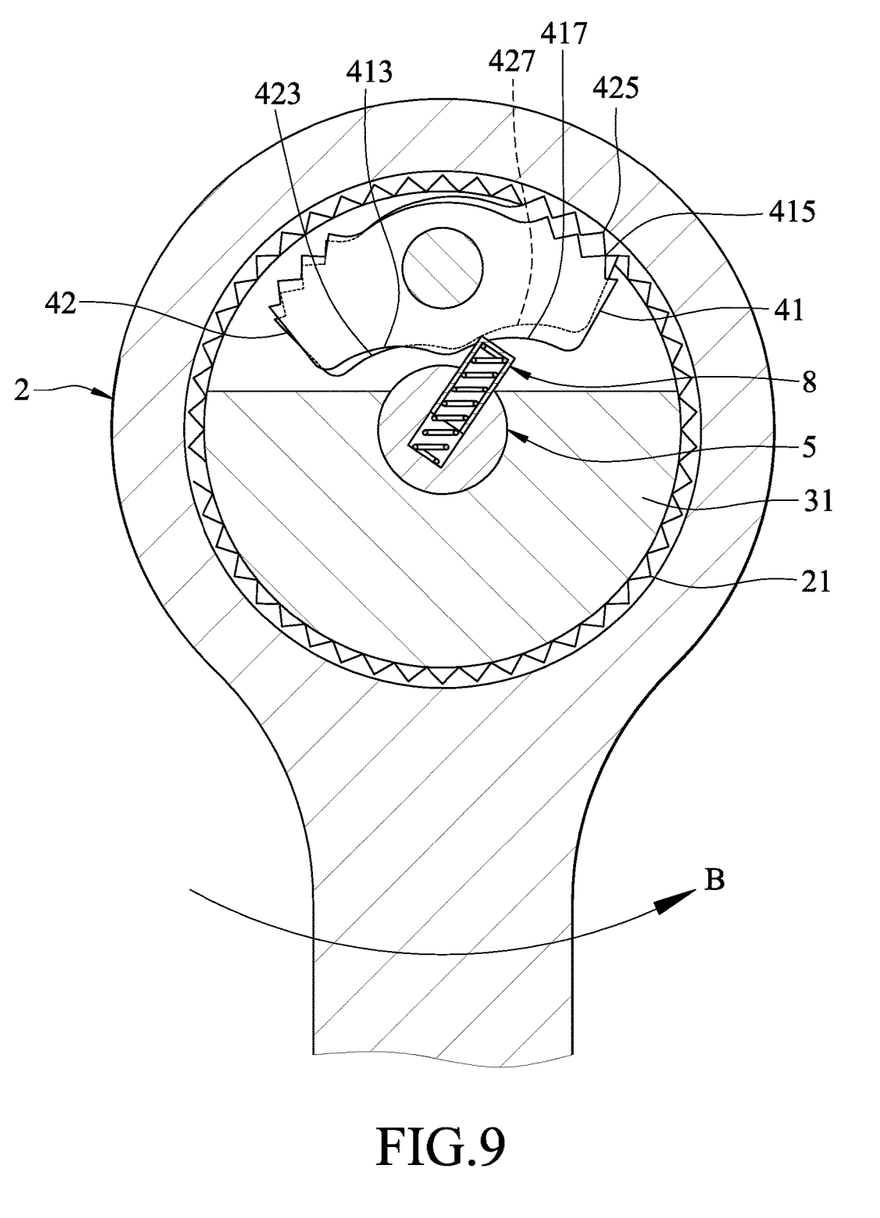
FIG. 9 is a view similar to FIG. 7 but illustrating that the direction-selecting rotary knob is at the counterclockwise position and the handle is rotated counterclockwise.

With further reference to FIG. 9, when it is desired to rotate the driving head 31 in the counterclockwise direction (B), the direction-selecting rotary knob 5 is rotated to the counterclockwise position, so that the push rods 8 press respectively against the counterclockwise concaved regions 417, 427 of the concaved portions 413, 423 of the first and second pawls 41, 42. Hence, the counterclockwise tooth regions 415, 425 of the first and second pawls 41, 42 engage resiliently the annular driving toothed portion 21. At this time, the counterclockwise toothed region 415 of the first pawl 41 does not mesh with the annular driving toothed portion 21, and the counterclockwise toothed region 425 of the second pawl 42 meshes with the annular driving toothed portion 21, so that further counterclockwise rotation of the second pawl 42 relative to the annular driving toothed portion 21 is prevented.

Subsequently, when the handle 1 and the annular driving toothed portion 21 are rotated in the counterclockwise direction (B), since the second pawl 42 cannot rotate relative to the annular driving toothed portion 21, the driving end 314 (see FIG. 6) is driven to rotate in the counterclockwise direction (B).

When the handle 1 and the annular driving toothed portion 21 are rotated in the clockwise direction (A) (see FIG. 7), they can rotate idly in the same manner as the first embodiment.

Alternatively, the first and second pawls 41, 42 may be formed as one piece. Or, the wrench may only include one resilient member 6, one push rod 8, and one radial hole 521.

While the present invention has been described in connection with what are considered the most practical embodiments, it is understood that this invention is not limited to the disclosed embodiments but is intended to cover various arrangements included within the spirit and scope of the broadest interpretation and equivalent arrangements.

What is claimed is:

1. A reversible ratchet wrench characterized by:
    a ratchet head including an annular driving toothed portion defining a through hole;
    a driving head extending rotatably through the through hole and having an outer peripheral surface formed with an accommodating space aligned with the annular driving toothed portion;
    a pawl unit including a first pawl and a second pawl that are disposed in the accommodating space, the first and second pawls overlapping each other, each of the first and second pawls having a ratchet toothed portion engageable with the annular driving toothed portion such that, when one of the first and second pawls meshes with the annular driving toothed portion, the other of the first and second pawls cannot mesh with the annular driving toothed portion; and
    a direction-selecting rotary knob disposed rotatably on the driving head and rotatable relative to the driving head between a clockwise position and a counterclockwise position such that, at the clockwise position, the pawl unit is connected between the driving head and the ratchet head so as to allow for clockwise co-rotation of the driving head and the ratchet head, while preventing counterclockwise co-rotation of the driving head and the ratchet head, and at the counterclockwise position, the pawl unit is connected between the driving head and the ratchet head so as to allow for counterclockwise co-rotation of the driving head and the ratchet head, while preventing clockwise co-rotation of the driving head and the ratchet head.

2. The reversible ratchet wrench as claimed in claim 1, further characterized by a resilient member disposed between the direction-selecting rotary knob and the driving head, the driving head further having a slide space formed in the outer peripheral surface and opposite to the accommodating space, and a contact wall disposed between the accommodating space and the slide space, the accommodating space and the slide space being opened upwardly, the contact wall having a clockwise end portion and a counterclockwise end portion that are opposite to each other, the direction-selecting rotary knob being rotatable about a rotating axis extending through the contact wall, and including a sliding post disposed in the slide space, the resilient member being connected to the sliding post and the pawl unit for biasing the pawl unit and the sliding post to contact one of the clockwise end portion and the counterclockwise end portion such that, when the direction-selecting rotary knob is at the clockwise position, the sliding post contacts the clockwise end portion of the contact wall, and the pawl unit is biased to contact the clockwise end portion and engages the annular driving toothed portion, and when the direction-selecting rotary knob is at the counterclockwise position, the sliding post contacts the counterclockwise end portion of the contact wall, and the pawl unit is biased to contact the counterclockwise end portion and engages the annular driving toothed portion.

3. The reversible ratchet wrench as claimed in claim 2, characterized in that each of the first and second pawls further has a contact portion opposite to the ratchet toothed portion and movable to contact the contact wall.

4. The reversible ratchet wrench as claimed in claim 1, further characterized by two pushing rods and two resilient members connected respectively to the push rods, the driving head further including an axial hole formed vertically therethrough and in spatial communication with the accommodating space, and a pivot shaft extending vertically through the accommodating space, the first and second pawls being rotatable about the pivot shaft, the direction-selecting rotary knob including a horizontal plate portion and a post portion extending downwardly from the horizontal plate portion and having two radial holes each permitting one of resilient members and one of the push rods to extend thereinto, the push rods being biased by the resilient members to push the first and second pawls to engage the annular driving toothed portion.

5. The reversible ratchet wrench as claimed in claim 4, further characterized in that each of the first and second pawls further has a concaved portion adjacent to the axial hole, each of the ratchet toothed portions having a clockwise tooth region and a counterclockwise tooth region that are opposite to each other such that, when the direction-selecting rotary knob is at the clockwise position, each of the push rods contacts one side of concaved portion of a corresponding one of the first and second pawls, and the clockwise tooth region of the corresponding one of the first and second pawls engages the annular driving toothed portion, and when the direction-selecting rotary knob is at the counterclockwise position, each of the push rods contacts the other side of concaved portion of a corresponding one of the first and second pawls, and the counterclockwise tooth region of the corresponding one of the first and second pawls engages the annular driving toothed portion.

6. The reversible ratchet wrench as claimed in claim 5, further characterized in that the concaved portion of each of the first and second pawls has a clockwise concaved region adjacent to the clockwise tooth regions of the first and second pawls, a counterclockwise concaved region adjacent to the counterclockwise tooth regions of the first and second pawls, and a ridge region disposed between the clockwise concaved region and the counterclockwise concaved region such that, when the direction-selecting rotary knob is at the clockwise position, the push rods contact respectively the clockwise concaved regions of the first and second pawls, and when the direction-selecting rotary knob is at the counterclockwise position, the push rods contact respectively the counterclockwise concaved regions of the first and second pawls.

7. The reversible ratchet wrench as claimed in claim 5, further characterized in that each of the clockwise tooth regions and the counterclockwise tooth regions of the first and second pawls has a plurality of tooth peaks and a plurality of tooth valleys, the tooth peaks of the clockwise tooth region and the counterclockwise tooth region of the first pawl being aligned respectively with the tooth valleys of the clockwise tooth region and the counterclockwise tooth region of the second pawl, the tooth valleys of the clockwise tooth region and the counterclockwise tooth region of the first pawl being aligned respectively with the tooth peaks of the clockwise tooth region and the counterclockwise tooth region of the second pawl.

* * * * *